Aug. 10, 1948.  J. M. DAVIES ET AL  2,446,815
SELF-SEALING FUEL TANK CONSTRUCTION
Filed March 4, 1943
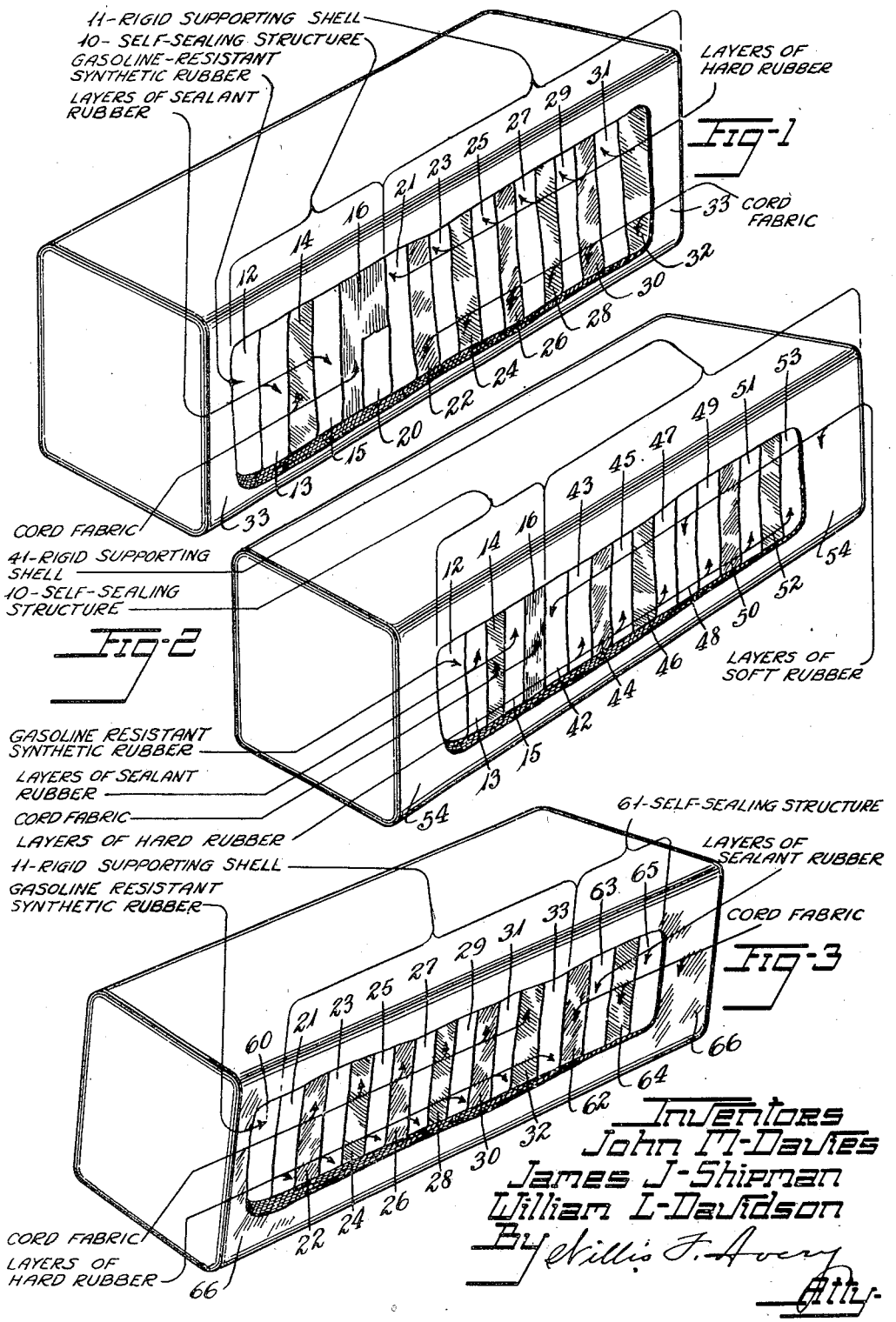

Patented Aug. 10, 1948

2,446,815

UNITED STATES PATENT OFFICE 2,446,815

SELF-SEALING FUEL TANK CONSTRUCTION

John M. Davies, James J. Shipman, and William L. Davidson, Akron, Ohio, assignors to The B. F. Goodrich Company, New York, N. Y., a corporation of New York Application March 4, 1943, Serial No. 477,976

8 Claims. (Cl. 154—43.5)

This invention relates to a stiff supporting member for gasoline and oil tanks containing a sealing member which serves to prevent leakage of fuel from the tank after puncture of the latter with a projectile.

Such self-sealing tanks in general comprise a gasoline-impervious lining, a resilient sealing member which swells readily when in contact with gasoline, a tear-resistant outer covering, and a stiff supporting member which serves to support the other members and provide rigidity for the tank.

The invention in this case resides in a new type of supporting member. Our new supporting members have a laminated structure comprising alternate layers of fibrous material, such as fabric, and an organic stiffening material. It is important that the layers of stiffening material be firmly adhered to the layers of fibrous material without complete impregnation of the latter.

The inner gasoline-resistant layer may be a foil such as Cellophane or metal foil, or any of the various flexible gasoline-resistant compositions possessing the requisite strength and resiliency, such as polyethylene polysulfide, polyvinyl alcohol plasticized with glycerine or the like, polyvinyl chloride plasticized with gasoline-insoluble materials, neoprene (polymerized chloroprene), the superpolyamides or the rubbery copolymers of butadiene with acrylonitrile, etc.

The sealing-member should possess sufficient strength and resilience to permit yield of the material and recovery after rupture by projectiles without appreciable loss of material; it should swell rapidly when in contact with gasoline, but without dissolving. Among the materials which possess these properties are vulcanized soft rubber, natural or synthetic, including closed-cell sponge rubber; mixtures of rubbery polyisobutylene with rubber or synthetic rubber, the rubber only being vulcanized (for example, mixtures of rubbery polyisobutylene with a copolymer of butadiene and acrylonitrile); mixtures of unvulcanized rubber with a copolymer of butadiene and acrylonitrile; or mixtures of rubber with neoprene in which the neoprene only is vulcanized. The sealing member may be divided into a plurality of layers alternating with sheets of tough, tear-resistant rubbery materials or with sheets of fabric.

The outer cover may be made from any tough, tear-resistant material such as fabric, rubber-coated fabric, leather, vulcanized rubber containing reinforcing pigments, or the like.

The stiff supporting member has in the past usually been made of sheet metal or wood. The function of this member is to prevent sagging and distortion of the tank when filled with liquid. Without this support the self-sealing tank is quite flexible or flabby and is unable to retain its shape when filled with liquid. The use of sheet metal or wood for the supporting shell, however, has been found to interfere with satisfactory sealing of the tank after puncture by a projectile. In the case of the metal shell the passage of a projectile therethrough has been found to produce foliation of the metal in the direction of the flight of the projectile. The projecting leaves of metal at the entrance point of the projectile may hold open the puncture in the self-sealing tank wall and prevent the resilient sealing structure from operating to close the puncture. Similarly, wooden supporting shells splinter badly when penetrated by a projectile, and the splinters may prevent effective sealing of the hole. Both metal and wooden shells are forced away from the sealing member and permanently distorted at the exit point. This lack of support for the sealing member permits the pressure inside the tank to rupture the sealing member, or at least prevents it from operating properly to seal the hole. Moreover, metal shells cause sparks which create a serious fire hazard. Other materials, such as vulcanized fiber, which have a sufficiently high modulus of elasticity to serve as a supporting shell, are so brittle that they shatter or crack extensively upon the first impact by a projectile with a resultant loss of most of their rigidity.

We have now found that an effective supporting member or shell for a self-sealing fuel tank may be made from a laminated structure consisting essentially of alternate layers of strong, resilient fibrous material and layers of an organic stiffening material having a high modulus of elasticity, preferably a heat-hardenable or thermosetting material, all firmly adhered together with minimum impregnation of the fibrous material with the stiffening material consistent with good adhesion.

Among the organic stiffening materials which may be used are phenol-formaldehyde type resins, urea-formaldehyde resins, melamine-formaldehyde condensation products, hard alkyd resins, hard rubber (natural or synthetic), methyl methacrylate polymers, polyvinyl alcohol, polyvinyl chloride, polyvinylidene chloride, polyvinyl acetate, cellulose esters and ethers, zein, casein, and other similar natural and synthetic resinous materials.

The layers of fibrous material may consist of such materials as layers of filamentary yarns which may or may not be woven into fabrics. The filaments or fibers which may be used include, among others, those of cotton, wool, linen, silk, glass, cellulose acetate, regenerated cellulose, vinyl resins, superpolyamides, and the like. These yarns may be used in the form of a square woven fabric or knitted fabric, or they may be used in the form of a weftless or weak-wefted fabric such as tire cord. The tightness of the weave may be varied over a wide range, depending upon the particular filament or fiber employed, upon the number of layers of fabric, and upon the relative thickness and properties of the layers of organic stiffening material. Fabrics ranging from cheesecloth to heavy duck may be successfully employed.

It is important that the layers of fabric and the stiffening material be firmly adhered together. This adhesion is readily secured when the stiffening material is made from a relatively soft composition which hardens or vulcanizes when heated. In that case the stiffening material is merely pressed firmly against the fabric while the laminated structure is being built up, or the stiffening material is applied to the surface of the fabric by means of a calender before the fabric layers are superimposed. The completed structure is then heated until the hardening process or vulcanization is complete. In some cases it is desirable to use an additional cement or adhesive between the fabric and the stiffening material, or to use a solution of one of the aforementioned stiffening materials in a volatile solvent as the adhesive. Indeed, it is sometimes preferable to build up the stiffening layers on the surface of the fabric layers by applying the material in the form of a solution, instead of in the form of a discrete sheet as when a calendering operation is used.

Whichever method is used, it is important for best results that only enough impregnation of the fabric with the cement or stiffening material be secured to obtain satisfactory adhesion between the layers. If thorough impregnation of the fabric is obtained, as for example when a solution of the stiffening material having a very low surface tension is employed, the fibers and yarns become so firmly united together that they act as a unit and take on the properties of the layers of stiffening material. In short, the layers of resinous materials should preferably be discontinuous in the yarns; that is, impregnation or permeation of the yarns by the resinous material should be only superficial. The desired effect is obtained when the individual filaments or fibers of the fabric layer are free to act, to a limited extent, independently of each other and of the layers of stiffening material. Thus projectiles cause a shattering or rupture of the laminated tank-supporting member in the area immediately in front of the projectile, while the remainder of the structure remains substantially unaffected.

For this reason it is important that, when particularly hard and brittle stiffening materials are employed, they be used in thin layers connected with each other chiefly by means of the yarn fibers only. If a relatively soft and resilient stiffening material is used, a fabric with an open weave, such as cheesecloth, may be used; with such a combination, obviously, there is considerable direct connection between the layers of stiffening material through the interstices of the fabric, so that the overall stiffness of the finished structure is approximately the same as that of the structure made with thin layers of harder material which are directly connected to each other only to a much lesser extent. In general, resins having a moderately high modulus of elasticity, such as hard rubber, should not be used in layers thicker than about .060 inch; resins having an extremely high modulus, such as urea-formaldehyde resins, may be used in layers as thin as .010 inch.

Since the thicknesses of most industrial fabrics are in the range of .010 to .060 inch, it will be apparent that the thickness of the fabric layer and that of the resin layer are of the same order of magnitude. However, the relative thicknesses, or weights, of fabric and stiffening material which it is desirable to use vary greatly depending upon the particular fabric and particular stiffening material employed. In general, however, it is desirable to keep the fabric: stiffening material ratio rather high, not less than about 1:2 by weight; that ratio may be as high as 2:1 or even higher in some cases.

In order to lend added stiffness to the structure, "floating" members of stiff material may be added; for example, one or more sheets of wood veneer, vulcanized fiber, or a fabric completely impregnated with one of the above-described stiffening materials may be inserted between the laminations, preferably just beneath the outer cover or just outside the sealing layer.

Adjacent layers of fabric in the laminated structure should be crossed for best results; i. e., there should be a substantial angular displacement between the direction of the warp threads in one fabric layer and the direction of the warp threads in the fabric layers on each side. This is particularly true in the case of weftless or weak-wefted cord fabrics, where the angular displacement may be as much as 90°. Although crossing the plies of fabric is not so important with square woven fabrics, superior results may usually be secured by rotating successive plies by amounts ranging from 20° to 90°.

The selection of the best fabric-stiffener combination as well as the determination of the total number of laminations depend upon a variety of factors, among the most important of which are the following: size of tank, geometry of tank, vulnerability or probable exposure to gunfire, and character of gunfire. In the case of a shell for a large tank the weight of the contents supported by each unit area of the shell wall is greater than in the case of a small tank; the shell wall of the large tank must therefore be stiffer than that of the small one. The geometry of the tank is important because there is formed in front of the projectile during its passage through the liquid contents of the tank a pressure cone. This means that the pressure produced by the passage of a projectile through a wide section of the tank and supporting shell is distributed over a large area, whereas if the projectile passes through a narrow section the pressure is concentrated on a much smaller area. Cylindrical tanks require heavier walls than rectangular ones because the former cannot yield to the pressure cone to the same extent as the latter. The use to which the fuel tank is to be put, i. e. the type of vehicle in which it is to be installed, and its location inside such vehicle, is an important factor in determining the amount of gunfire to which the tank is likely to be exposed and hence the weight of the tank-supporting shell which will be necessary. The type of gunfire to which the tank will be exposed, that is, the caliber of the projectiles, is also an important factor in determining just how heavy the tank-supporting shell should be.

All of these factors, however, need be taken into consideration only in obtaining optimum effectiveness of the tank-supporting shell. The basic structure in all cases is as has been previously described, and only minor modifications are entailed when making adjustments for the foregoing factors. These modifications generally involve only changing the number of laminations in the shell wall to make it heavier or lighter as the case may be.

As a specific example of our invention we shall describe the construction of three of our tank shells. In the appended drawing, Fig. 1 is a perspective view of one of our supporting shells partly cut away and in section to show the laminar construction of the shell and the arrangement of the sealing member and lining; Figs. 2 and 3 are similar views of two other modifications of our invention.

In Fig. 1 the conventional self-sealing fuel tank structure 10 is supported by the stiff supporting shell 11. The gasoline resistant lining 12 consisting of a butadiene-acrylonitrile copolymer is applied first to a collapsible building form of the desired size and shape. This layer may be applied in the form of a thin sheet, or as a solution in a volatile solvent if desired. After drying, it is covered with a layer 13 of sealant about 0.1 inch thick which consists of a mixture of 75 parts of natural rubber, 25 parts of reclaimed rubber, 5 parts of magnesium oxide, and 1 part of sulfur. The sealant layer is in turn covered with a layer of vulcanizable rubber-coated rayon cord fabric 14 which weighs about .09 lb. per sq. ft. and has 22 cords per inch with a cord diameter of .032 inch, another layer of sealant 15, and a layer of vulcanizable rubber-coated rayon cord fabric 16, the cords of which cross those of ply 14 at an angle of about 45°. The foregoing plies are well rolled after application in order to insure good adhesion between plies. The supporting member or shell 11 is adhered firmly to the top portion of the self-sealing tank in order to support it and keep it properly positioned, but for best results the lower portion of the tank should not be integrally bound to the shell. The area of adhesion should be less than substantially one-third of the total external surface area of the self-sealing tank 10. It is found best to apply a layer of paraffin or other weakly adhesive cement 20 over the lower portion of ply 16 in order to facilitate the building of the tank and still permit the desired freedom between the shell 11 and tank 10 after vulcanization of the assembly. The shell 11 is constructed from alternate layers of rayon cord fabric weighing .09 lb. per sq. ft. and having 22 cords per inch with a cord diameter of .032 inch, and hard rubber composition. The recipe of the hard rubber composition used (parts by weight) is as follows:

| | |
|---|---|
| Rubber | 100.0 |
| Zinc oxide | 40.0 |
| Magnesium oxide | 12.0 |
| Hydrated lime | 12.0 |
| Litharge | 5.0 |
| Mineral rubber | 25.0 |
| Sulfur | 50.0 |
| Accelerator | 1.25 |

The rubber composition is applied by calender to each side of the rayon fabric until the total thickness of the fabric-rubber ply is about .04 to .05 inch. Six successive layers of this rubber-coated fabric 22, 24, 26, 28, 30, and 32 are then applied to the surface of the tank, each layer being firmly rolled and pressed into place to insure good adhesion to the preceding layer, and each layer having its cords rotated at an angle of 90° with respect to the cords of the layers above and below. After application of ply 32 the whole structure is vulcanized by heating 6 hours at 300° F. in hot air at a pressure of 60 lb./sq. in. The completed structure has layers 21, 23, 25, 27, 29, 31, and 33 of hard rubber alternating with the layers of fabric.

The building form, which may be of any suitable collapsible type, is removed from the interior in the usual manner after the structure has been vulcanized and cooled.

The supporting member or shell of the tank constructed as described above has a total thickness of about 0.25 inch and a modulus of elasticity by bending of more than 150,000 lb./sq. in. Its weight is less than 1.75 lb./sq. ft.

The completed tank successfully sealed punctures made by .50 caliber bullets; the shell retained its initial stiffness to a remarkable extent even after penetration by the projectile, and yielded no foliations or fragments at the point of penetration which could prevent effective operation of the sealing layer.

Another modification of our invention is shown in Fig. 2, in which the self-sealing fuel tank 10 is adhered over all its surface to the inner layer 42 of the supporting member or shell 41. In this construction, it is impossible for the self-sealing tank to collapse or fold up within the shell no matter how severe the treatment it receives. The supporting member or shell 41 here includes three cushioning members 42, 48, and 54 made from a vulcanized soft rubber containing a high percentage (at least 25%) of carbon black, such as the rubber compositions used for tire treads. These cushioning layers serve not only to increase the strength of the shell, but also to increase its resilience. Other tough and resilient compositions may also be used for the cushioning layers, such as plasticized gamma polyvinyl chloride, plasticized polyvinyl acetate, plasticized polyvinyl acetals, plasticized cellulose esters or ethers, and synthetic rubbers such as neoprene or copolymers of butadiene with styrene, methyl acrylate, methyl methacrylate, isobutylene, acrylonitrile, or the like. Plies 44, 46, 50, and 52 are rayon cord fabric such as was used in the preceding example, the cords of each ply crossing the cords of the adjacent plies at an angle of about 90°. The fabric plies are coated on each side with a vulcanizable hard rubber composition such as that used in the modification described in Fig. 1, before being built into the structure. After vulcanization in hot air, the finished structure consists of layers of fabric 44, 46, 50, and 52, layers of hard rubber 43, 45, 47, 49, 51 and 53; and layers of tough, resilient rubber 42, 48, and 54. The thicknesses of the various plies which we have found to be satisfactory are: the cord diameter of the fabric, about $\frac{1}{32}$ inch; the hard layers, about $\frac{1}{64}$ inch; the soft rubber layers about $\frac{1}{16}$ inch. In order to obtain best adhesion between the fabric and the hard rubber, it has been found desirable to apply one-half of ply 45 to fabric ply 44, the other half to fabric ply 46 by means of a calender, and then to press the coated fabrics firmly together while building the shell. Similarly, one-half of ply 51 is applied to fabric ply 50, the other half to fabric ply 52. The weight of the finished structure is about 2.3 lb./sq. ft.

The supporting member or shell may be placed inside the self-sealing tank structure if desired. The gasoline-impervious lining should be placed inside the supporting member. This modification is shown in Fig. 3 in which a gasoline-resistant lining 60 consisting of a butadiene-acrylonitrile copolymer is covered with and adhered to the stiff supporting member 11, identical in construction with the supporting member 11 described and shown in Fig. 1. Over the exterior of the shell 11 is applied a self-sealing structure 61, which consists of three layers of rayon cord fabric 62, 64, and 66, similar to that used in the preceding examples between which are placed two layers of sealant 63 and 65 about 0.1 inch thick consisting of a mixture of 75 parts of natural rubber, 25 parts of reclaimed rubber, 5 parts of magnesium oxide and 1 part of sulfur. The cords of cord fabric layer 64 should preferably be crossed at an angle of about 90° with respect to the cords of layers 62 and 66. The whole structure is then vulcanized by heating at 300° F. for about six hours in hot air at a pressure of 60 lb./sq. in.

It should be understood that although we have described only specific embodiments of our invention, there are numerous modifications which are equivalent to the structures described and which are intended to be included within the scope of the appended claims. There are many variations and modifications in the construction of the self-sealing member which may be used with our supporting shell to give substantially the same results.

More particularly, other natural or synthetic resinous materials may be substituted for the hard rubber of our example. In this connection, it should be noted that certain fabrics, particularly those made of rayon, tend to deteriorate in the presence of acids. Since many of the phenol-formaldehyde and urea-formaldehyde type resins have a deleterious effect on rayon or silk fabric, it is preferable to employ fabrics or yarns woven from glass, cotton, or other acid-resistant filaments in conjunction with these resinous materials. It is also desirable to apply certain of the resinous materials to the fabric in the form of a solution in order to insure good adhesion between the fabric layer and the resin layer. However, a solution should not be used if it has a low surface tension because of the undesirably high degree of impregnation of the fabric with the resinous material which is thus secured. Even a solution having a high surface tension should not be used if the resin requires a long period of heating at a high temperature in order to harden or set. Solutions of quick-setting resins are preferred. Resins which are water-soluble, such as the phenol-formaldehyde or urea-formaldehyde type resins, may generally be applied to the surface of the fabric in the form of an aqueous solution. Heating the laminated structure drives off the water and completes the condensation of the resin to a hard solid.

Emulsions of the resinous materials may also be used in constructing the tank shell; for example, rubber latex containing suitable amounts of sulfur to vulcanize to hard rubber and other compounding ingredients may be applied to the fabric by dipping, spraying, or brushing.

We claim:

1. In a self-sealing fuel tank adapted to seal punctures therein caused by projectiles comprising a gasoline impervious lining, a sealing layer which swells in gasoline, and a tear-resistant outer cover, a non-metallic non-shattering stiff supporting member therefor comprising a plurality of layers of filamentary yarns interspersed between and adhered to layers of hard resinous material, said yarns being only superficially impregnated with the resinous material, said supporting member being disposed externally to said sealing layer and being firmly adhered thereto only over the upper portion of said sealing layer, the area of adhesion being less than substantially one-third of the total external surface area of said sealing layer.

2. A self-sealing tank adapted to seal punctures therein caused by projectiles comprising in combination a gasoline impervious lining, a sealing layer which swells in gasoline, and a non-metallic non-shattering stiff supporting member therefor comprising a plurality of layers of filamentary yarns interspersed between and adhered to layers of hard resinous material, said yarns being only superficially impregnated with the resinous material, said supporting member being disposed externally to said sealing layer and being firmly adhered thereto only over the upper portion of said sealing layer, the area of adhesion being less than substantially one-third of the total external surface area of said sealing layer.

3. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor comprising a plurality of layers of filamentary yarns interspersed between and firmly adhered to layers of hard resinous material, said yarns being only superficially impregnated with the resinous material, said supporting member having sufficient stiffness to prevent substantial sagging and distortion of said tank when filled with fuel and being substantially free of any tendency to foliate upon penetration by a projectile; said lining, sealing layer, and supporting member all being adhered together.

4. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor substantially coextensive in area with said lining and sealing layer comprising a plurality of layers of filamentary yarns interspersed between and firmly adhered to layers of hard resinous material, said yarns being only superficially impregnated with the resinous material, said supporting member being outside said sealing layer and having sufficient stiffness to prevent substantial sagging and distortion of said tank when filled with fuel and being substantially free of any tendency to foliate upon penetration by a projectile; said lining, sealing layer, and supporting member all being adhered together.

5. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor comprising a plurality of layers of textile fabric interspersed between and firmly adhered to layers of thermoset hard resinous material, said fabric being only superficially impregnated with the resinous material, said supporting member being outside said sealing layer and having sufficient stiffness to prevent substantial sagging and distortion of said tank when filled with fuel and being substantially free of any tendency to foliate upon penetration by a projectile; said lining, sealing layer, and supporting member all being adhered together.

6. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor substantially coextensive in area with said lining and sealing layer comprising a plurality of cross-plied layers of cotton fabric interspersed between and firmly adhered to layers of thermoset hard resinous material, said fabric being only superficially impregnated with the resinous material, said supporting member having sufficient stiffness to prevent substantial sagging and distortion of said tank when filled with fuel and being substantially free of any tendency to foliate upon penetration by a projectile; said lining, sealing layer, and supporting member all being adhered together.

7. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor substantially coextensive in area with said lining and sealing layer comprising a plurality of cross-plied layers of cotton fabric interspersed between and firmly adhered to layers of thermoset hard resinous material, said fabric being only superficially impregnated with the resinous material, and the weight of said fabric being from one-half to twice the weight of said resinous material, said supporting member being outside said sealing layer and having sufficient stiffness to prevent substantial sagging and distortion of said tank when filled with fuel and being substantially free of any tendency to foliate upon penetration by a projectile; said lining, sealing layer, and supporting member all being adhered together throughout their extent.

8. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor substantially coextensive in area with said lining and sealing layer comprising a plurality of cross-plied layers of cotton fabric interspersed between and firmly adhered to layers of thermoset urea-formaldehyde resin, said fabric being only superficially impregnated with the resinous material, and the weight of said fabric being from one-half to twice the weight of said resinous material, said supporting member being outside said sealing layer and having sufficient stiffness to prevent substantial sagging and distortion of said tank when filled with fuel and being substantially free of any tendency to foliate upon penetration by a projectile; said lining, sealing layer, and supporting member all being adhered together throughout their extent.

JOHN M. DAVIES.
JAMES J. SHIPMAN.
WILLIAM L. DAVIDSON.

REFERENCES CITED

The following references are of record in the file of this patent:

UNITED STATES PATENTS

| Number | Name | Date |
| --- | --- | --- |
| 561,905 | Mercier | June 9, 1896 |
| 1,297,305 | Thacher | Mar. 11, 1919 |
| 1,325,448 | Macbeth | Dec. 16, 1919 |
| 1,381,175 | Ericsson | June 14, 1921 |
| 1,601,911 | Godfrey | Oct. 5, 1926 |
| 1,779,397 | Kraft | Oct. 21, 1930 |
| 2,112,544 | Rice | Mar. 29, 1938 |

Certificate of Correction

Patent No. 2,446,815. August 10, 1948.

JOHN M. DAVIES ET AL.

It is hereby certified that errors appear in the printed specification of the above numbered patent requiring correction as follows:

Column 2, line 25, for the word "prevents" read *prevent*; column 4, line 21, for "that" read *the*; column 7, line 36, for "example" read *examples*; column 10, following line 42, list of references cited, add the following:

| | | |
|---|---|---|
| *2,128,097* | *Mains* | *Aug. 23, 1938* |
| *2,187,383* | *Ludwig* | *Jan. 16, 1940* | and that the said Letters Patent should be read with these corrections therein that the same may conform to the record of the case in the Patent Office.

Signed and sealed this 28th day of June, A. D. 1949.

[SEAL]

THOMAS F. MURPHY,
*Assistant Commissioner of Patents.*